United States Patent [19]

Titus et al.

[11] Patent Number: 4,859,080
[45] Date of Patent: Aug. 22, 1989

[54] DYNAMIC THERMAL DISPLAY SIMULATOR

[75] Inventors: Joseph S. Titus, Sudbury; Dexter Wang, Concord; Harold A. Graham, Acton, all of Mass.

[73] Assignee: SSG, Inc., Waltham, Mass.

[21] Appl. No.: 223,448

[22] Filed: Jul. 22, 1988

[51] Int. Cl.⁴ ............................ G01K 1/16; G09G 3/22
[52] U.S. Cl. .................................. 374/134; 340/786; 340/752; 340/755; 340/766; 219/543; 250/494.1; 250/495.1; 430/944
[58] Field of Search ............... 374/134; 340/752, 755, 340/766, 783, 786; 219/216 PH, 543; 430/944; 250/495.1, 494.1

[56] References Cited

U.S. PATENT DOCUMENTS

| | | | |
|---|---|---|---|
| 3,227,879 | 1/1966 | Blau et al. | 250/495.1 |
| 3,848,245 | 11/1974 | Marshall | 340/781 |
| 3,877,008 | 4/1975 | Payne | 340/786 |
| 3,936,817 | 2/1976 | Levy et al. | 340/713 |
| 4,035,607 | 7/1977 | Wu | 219/552 |
| 4,378,489 | 3/1983 | Chabinsky et al. | 250/493.1 |
| 4,500,878 | 2/1985 | Hareng et al. | 340/713 |
| 4,525,708 | 6/1985 | Hareng et al. | 340/713 |
| 4,535,341 | 8/1985 | Kun et al. | 340/781 |
| 4,572,958 | 2/1986 | Durand et al. | 250/495.1 |
| 4,623,901 | 11/1986 | Nagashima | 219/216 PH |
| 4,724,356 | 2/1988 | Daehler | 250/495.1 |
| 4,763,136 | 8/1988 | Isobe | 219/216 PH |
| 4,769,527 | 9/1988 | Hart et al. | 219/216 |

FOREIGN PATENT DOCUMENTS 0223412 12/1984 Japan .
2117957 10/1983 United Kingdom .

Primary Examiner—William A. Cuchlinski, Jr.
Assistant Examiner—Diego F. F. Gutierrez
Attorney, Agent, or Firm—Hamilton, Brook, Smith & Reynolds

[57] ABSTRACT

A dynamic thermal display simulator for testing thermal sensors having a matrix of individually programmable heater elements which are arranged in a linear array on the edge of a board comprising a low, thermal-conductive, electrically insulating substrate. A plurality of boards are arranged in rows to create the matrix.

19 Claims, 8 Drawing Sheets

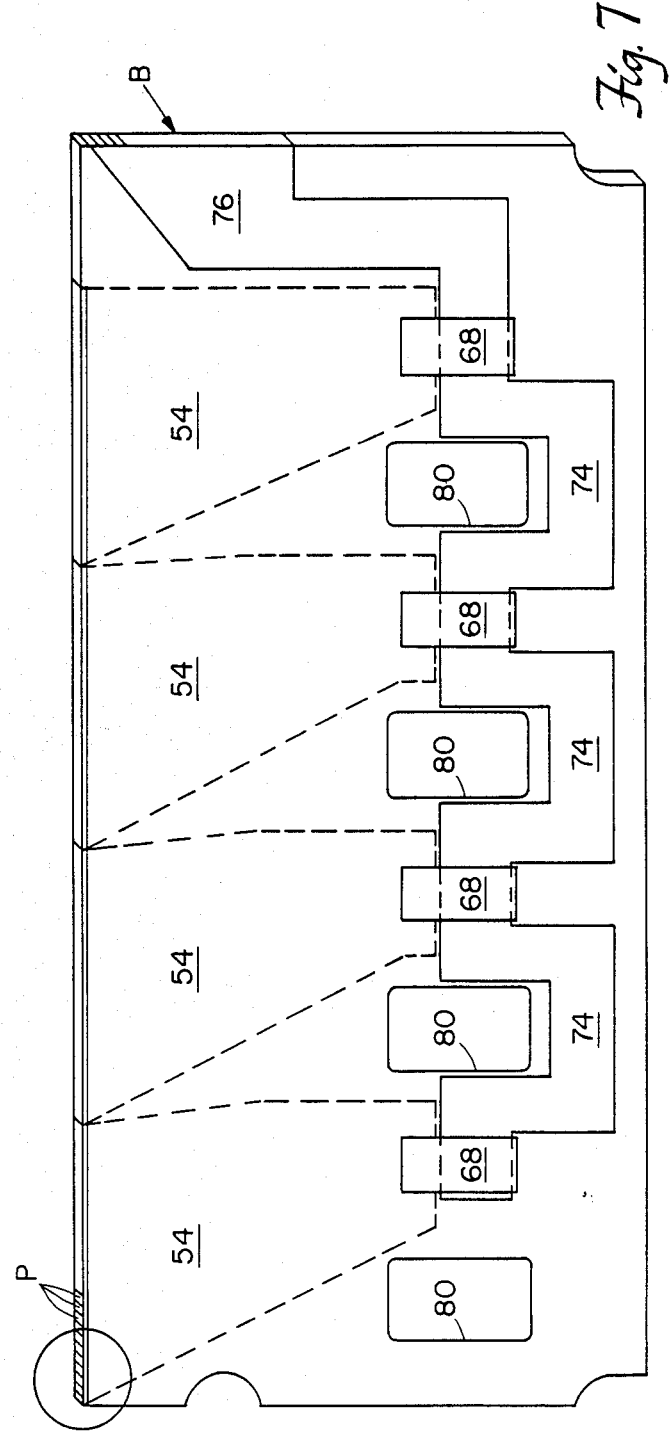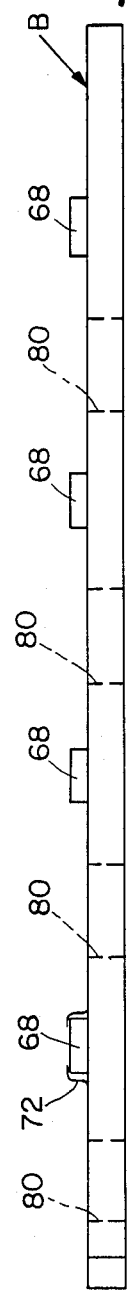

DYNAMIC THERMAL DISPLAY SIMULATOR

FIELD OF THE INVENTION

The present invention relates to thermal display devices for testing thermal sensors and more particularly to a thermal display simulator which operates dynamically to realistically simulate actual use conditions.

BACKGROUND OF THE INVENTION

The invention resides in equipment which is designed to simulate infrared scenes for testing thermal sensors, in other words, for testing devices which respond to thermally emitted radiation. The art is replete with infrared simulators which produce static scenes which are derived from partially transparent filters placed in front of black bodies operating at temperatures to approximate an average scene temperature. This may be compared to a photographic slide projector. To change the range of the scene thus produced, zoom optical systems have been employed. In like manner, moving targets within a fixed scene are simulated by the use of small black bodies on an XY stage or other precision motion generating device. The scenes are optically combined using beam splitters to present composite scenes which include a background and movable targets. This scene is then presented to the sensor.

Another concept has been the use of heated pixels to generate infrared scene simulation. For the most part, attempts using this concept have been unsuccessful because of the creation of a poor fill factor. That is, much of the scene area is inactive and is taken up with electrical leads, leaving very little space for the generation of individual infrared energy.

Another problem with prior art heated pixel devices is what is known as thermal blooming or cross talk from one heated pixel to an unheated adjacent pixel. This creates a larger feature than that desired on a thermal trail.

Many attempts resulted from the use of planar technology wherein heater elements and their leads are deposited on a single substrate. The problems have not been mitigated even with the use of multilayer circuit boards and microcircuit photolithography.

The present invention solves these problems in the use of heated pixel technology. Each of the pixels are isolated one from another to eliminate thermal blooming. The planar technology is replaced by a three-dimensional assemblage of leads and control circuitry. Such supportive elements do not reside in the plane of the heated pixels.

An object of this invention is to produce a device for generating a dynamic infrared scene for the ground testing of various infrared sensors.

Another object of this invention is to generate the equivalent of an infrared moving picture, i.e., a scene which is actually dynamic.

Many infrared sensors operate at cryogenic temperatures against cryogenic backgrounds and movement in that environment complicates simulated design.

It is yet another object of this invention to produce a true temperature representation of each pixel in the scene by controlling the individual pixel temperature to a degree corresponding to the temperature of an object in an actual scene. The present invention is intended to produce an intensity of radiation emitted by a pixel at a constant temperature over an appreciable range by the judicious control of the electrical current applied to a pixel. The pixels lend themselves to precise current pulsing and pulse repetition rates.

It is contemplated that the present invention when controlled by a computer using appropriate software can depict a wide variety of scenes with interaction between the simulator and the sensor to show the scene observed by the sensor as the sensors field of use shifts due to simulated attitude changes and rate changes.

SUMMARY OF THE INVENTION

The invention resides in a dynamic thermal display simulator for testing thermal sensors. It includes a matrix of individually programmable heater elements. The heater elements are arranged in a matrix which is a substantially flat, rectangular composite upon which a complete scene can be developed. Each of the heater elements are formed in a linear array on the edge of a board comprising a low thermal conductive, electrically insulating substrate. A plurality of boards are arranged in rows to create the matrix. Each heater element is separated from the adjacent element by an air space. Each of the heater elements also is connected to a heat sink to dissipate heat from the heater element as rapidly as possible. Each of the boards, in turn, is separated from an adjacent board by an insulating film.

The heater element is a thin film resistor which is deposited on the face or end surface of a low thermal conductor, electrically insulating substrate. A highly conductive material, in turn, is deposited on both sides of the substrate and is photolithographically etched to form electrical leads to the heater elements, one side being the electrical common lead and the other being a dedicated lead. The lead material also conducts heat away from the pixel to a heat sink after the current has been turned off.

The substrate is a substantially rectangular solid portion projecting from a board of insulating material which is low in thermal conductivity. A plurality of such elements project side-by-side from the board.

The leads are in contact with the resistive material along chamfered edges of the substrate which are contiguous with the face on the end surface. The insulative material which is superposed on the lead terminates at a point which is spaced from the resistive material on the end surface. The heat sink material of one of the elements is in engagement with the insulating material of an adjacent element.

The dynamic thermal display simulator for testing thermal sensors may also be defined as a matrix of individually programmable resistive surfaces electrically insulated from each other and arranged substantially in a plane. There are means for conducting energy to each resistive surface to heat it and produce infrared radiation. In addition there are means for conducting heat away from each surface to reduce the infrared radiation and there are control means responsive to predetermined programming to control the conduction of energy to and from the resistive surfaces to produce a detectable pattern on the plane of the matrix.

A plurality of integrated circuit chips are positioned on the substrate boards and are connected to a plurality of dedicated leads, each of which connects to one of the resistive surfaces to heat the resistive surface in accordance with a pre-programmed pattern. Each of the boards contain apertures or openings to a accommodate the chips on the next adjacent board whereby the boards themselves may be assembled in close proximity.

The above and other features of the invention including various and novel details of construction and combinations of parts, will now be more particularly described with reference to the accompanying drawings and pointed out in the claims. It will be understood that the particular dynamic thermal display simulator embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG. 3A is an enlarged view of a portion of the pixel shown in FIG. 3.

FIG. 7 is a detail view of one board.

FIG. 7A is an end view of the board shown in FIG. 7.

DETAILED DESCRIPTION OF THE INVENTION

Figure 1:
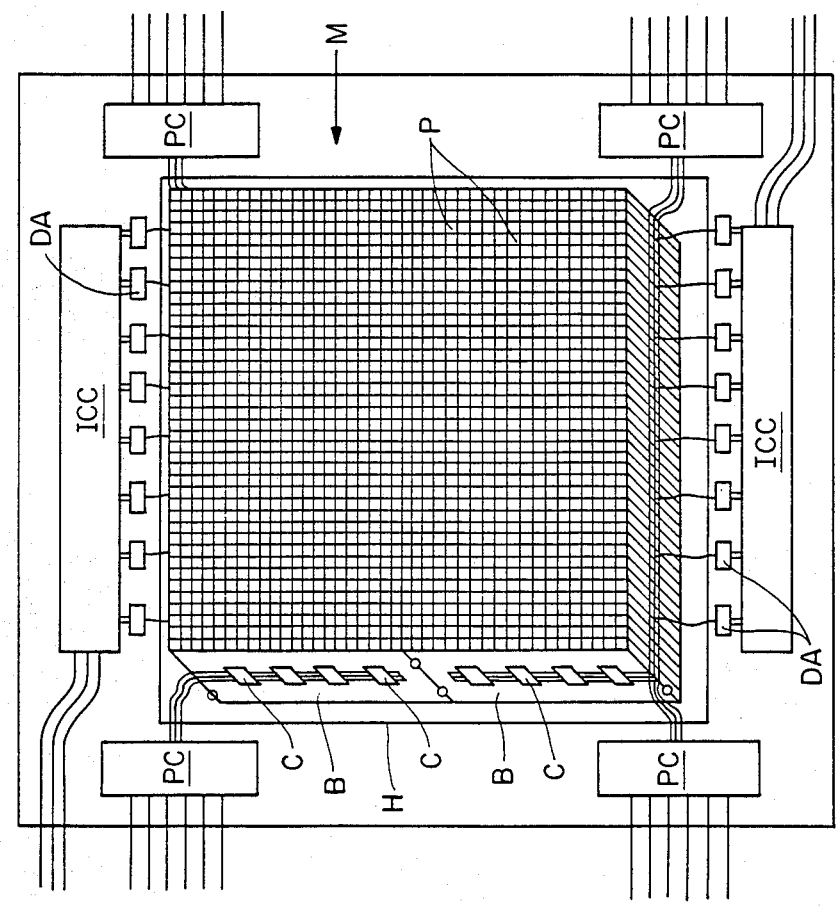
FIG. 1 is a schematic view of a dynamic thermal display simulator embodying the features of the present invention.

Referring to FIG. 1, there will be seen a schematic or illustrative dynamic thermal display simulator embodying the invention. It includes a matrix M of pixels P arranged in rows. In the illustrative embodiment shown in FIG. 1, there are 1600 pixels arranged in 40 rows of 40 pixels each. However, in a commercial embodiment there would be, for example, 512 rows of 512 pixels per row resulting in a matrix of 262,144 pixels. The pixels are formed along the top of boards B which are arranged side-by-side in rows. Two boards B are joined together at their edges to form one row. The boards are positioned above a heat sink H which in turn is in or in communication with a low temperature vessel (not shown).

Intensity control circuitry, generally indicated ICC, operating through digital to analog converters, designated DA, and power control circuitry, arranged in sub groups designated PC, supply the power to the pixels by way of integrated circuit chips secured to the boards B in groups. Each chip C supplies power to a plurality of pixels as will be described in greater detail hereinafter.

Pixels as herein defined, include not only the resistive heater elements that produce the infrared radiation but their substrate and related structure.

Figure 2:
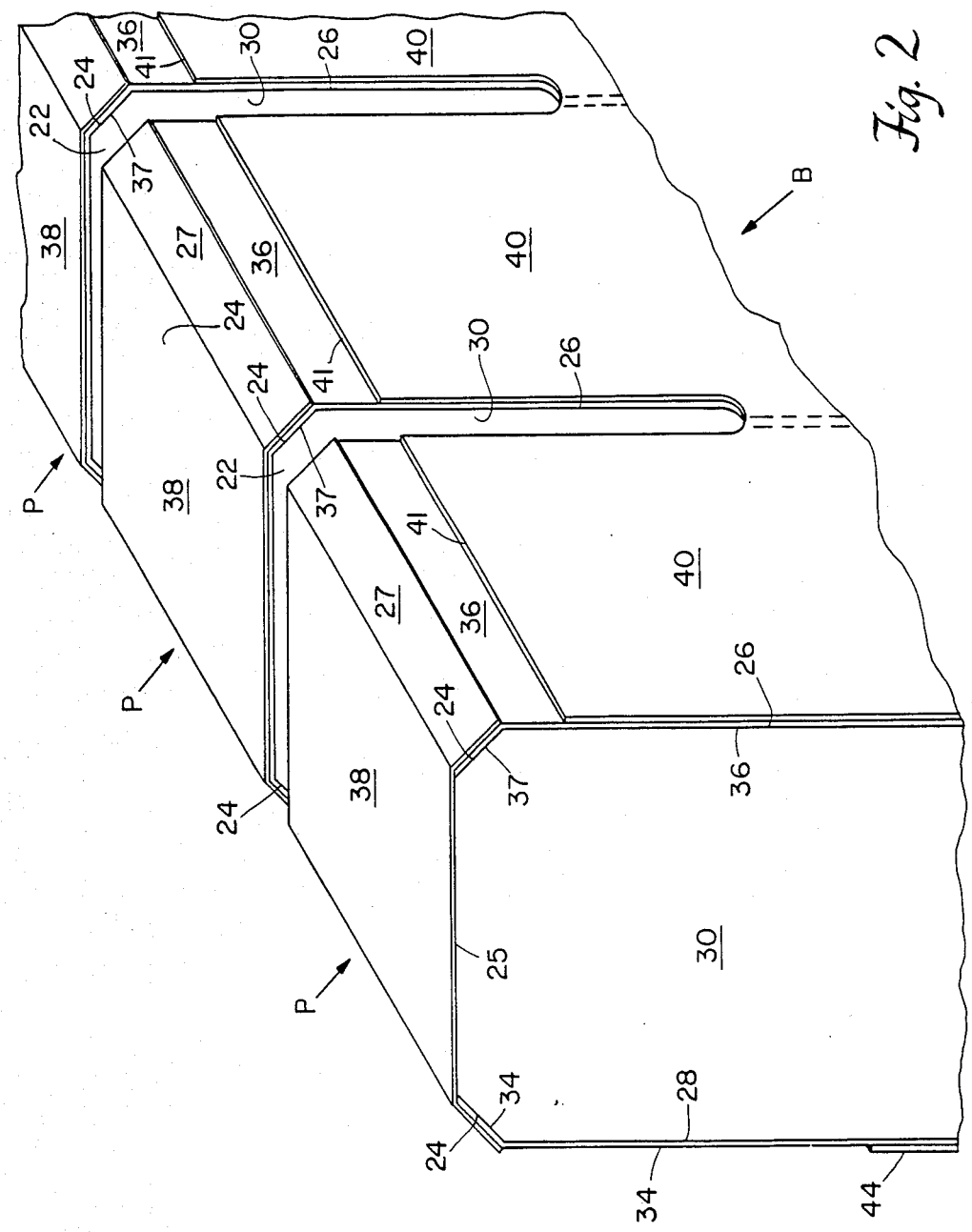
FIG. 2 is a perspective view, substantially enlarged, of a part of a row of heater elements or pixels.
Figure 3:
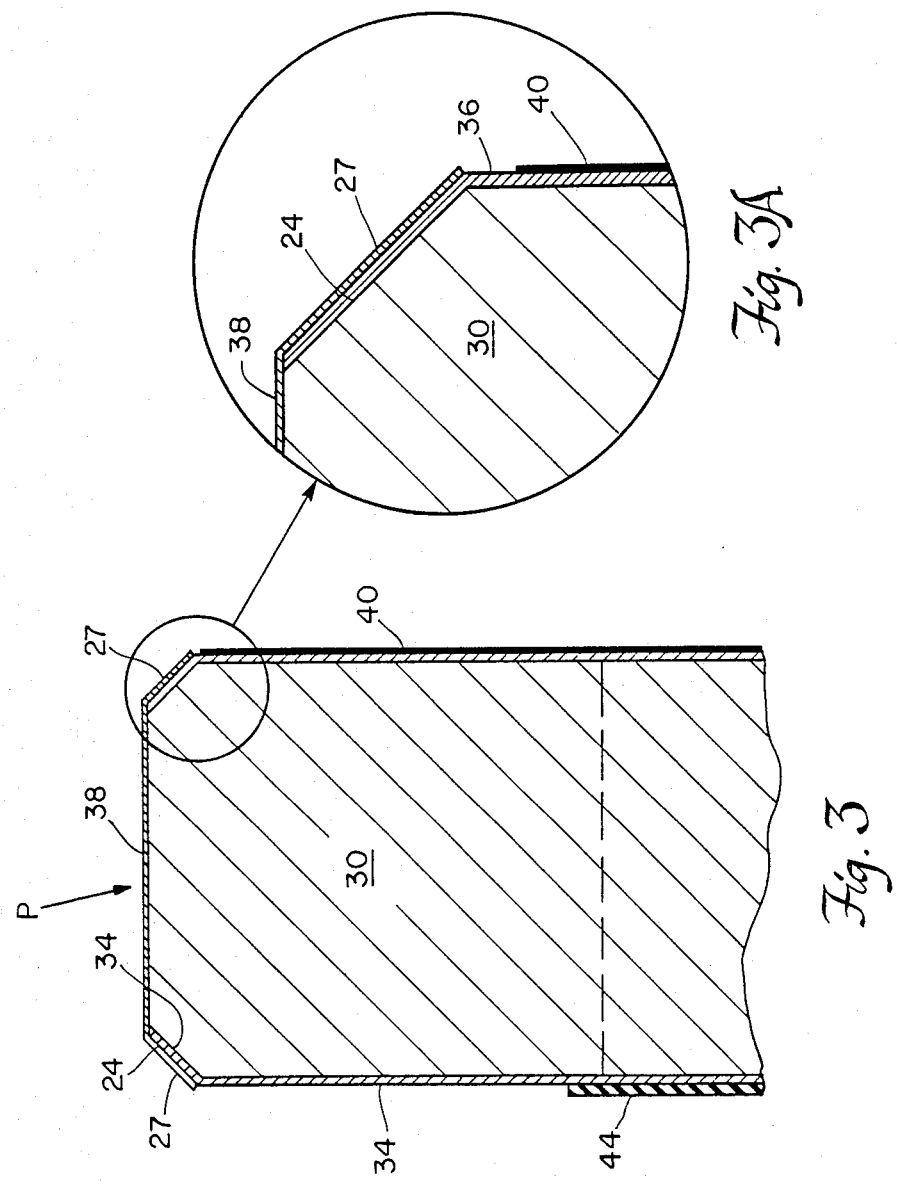
FIG. 3 is a cross-sectional view of a pixel.
Figure 4:
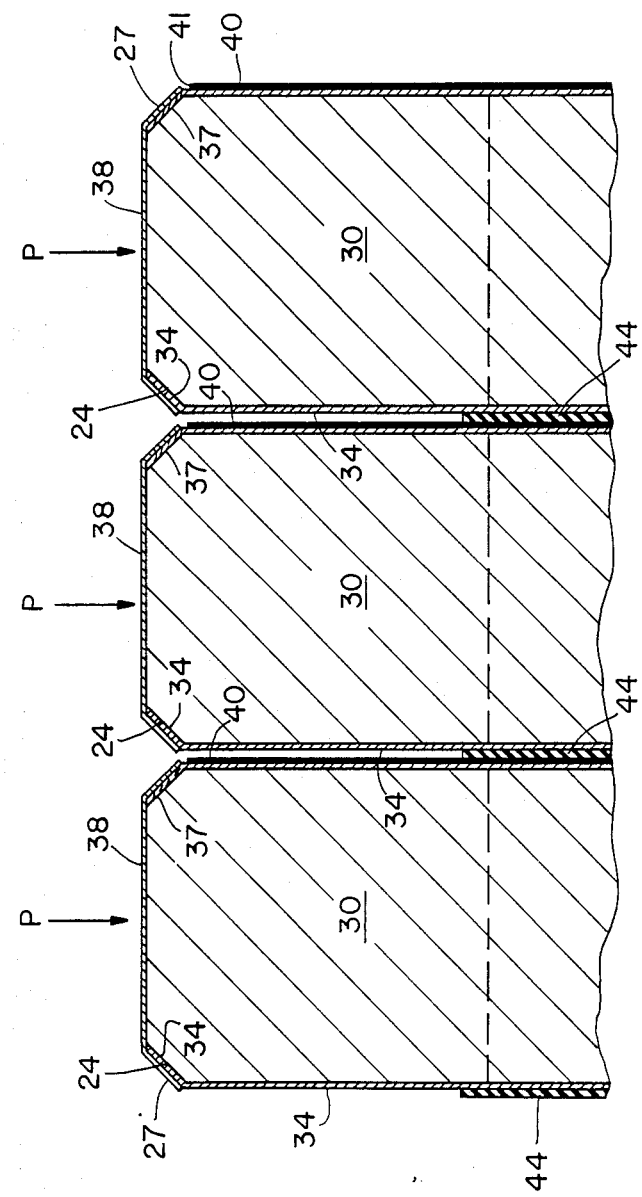
FIG. 4 is a sectional view of three rows of pixels.

The pixels P, per se, are best seen, substantially enlarged, in FIGS. 2 to 4. The pixels P are formed side-by-side along the upper edge of the boards B which are thin strips of substrate insulating material. The substrate boards B are slitted as at 22 to separate each pixel P by an air gap from those adjacent to it.

The substrate can be made of one or more substantially nonconductive materials such as glass, fused quartz, ceramic, overcoated metal or plastic laminates, just to name a few. The upper corners of each pixel P are chamfered as at 24, thus producing a substantially flat, rectangular end surface 25. The surfaces 25 are thus spaced from each other by the slits 22 and from those on adjacent boards B by the chamfered surface 24. The front 26 and the back 28 of the substrate are flat and parallel as are the sides 30 defined by the slits 22 (only the three front-facing sides can be seen in FIG. 2), thus each pixel is a rectangular solid having beveled or chamfered or upper corners 24 and a flat top or end surface 25.

Secured to the back surface 28 of the pixel is a common lead 34 which may be applied as a film by evaporation or sputtering processes. The leads are made of good conductive materials such as gold, aluminum or silver. The common lead 34 extends not only over the back surface 28 of the pixel P but over the chamfered corner 24 which is contiguous with the back surface and the end surface 25, as well.

The front surface 26 of each pixel P has the individual or dedicated lead 36 secured to it. It is in the form of a film of conductive material such as gold, silver or aluminum, which may be applied to the face of the board B by evaporation or a sputtering process and subsequently etched by a photographically produced lead pattern to be described in more detail hereinafter. Like the common lead 34, the individual or dedicated lead 36 extends upwardly at 37 over the chamfered corner 24 which is contiguous with the end surface 25.

The actual resistor or heater element is designated 38 and is applied to the top or end surface 25 of the pixel P. It is in the form of a film which may be evaporated, sputtered or pyrolitically deposited. It is made of high resistance material, such as metal films, as for example, nichrome, chromium, tungsten, titanium, tantalum or rehenium. The films could also be cermet films, as for example, chromium-silicon monoxide, gold-tantalum oxide, chromium silicide-tantalum silicide, aluminum oxide, germanium-chromium. Also, it may be a semiconductor film, as for example, boron/carbon or tin oxide. The resistor film or heater element 38 is deposited directly on the top or end surface 25 and, at area 27, over the leads 34 and 37 which have been extended upwardly and over the chamfered corners 24 so as to make good electrical contact therewith.

The front surface 26 of the pixel P has a layer of insulating material 40, evaporated or sputtered, directly over the individual or dedicated lead 36. It terminates at a line 41 close to but spaced from the chamfered corner 24.

The insulating layer 40 is made from evaporated or sputtered films or thermally grown films, as for example, silicon monoxide, silicon dioxide, aluminum oxide, titanium dioxide or silicon nitride, these all being substantially non-conductive insulating materials.

In order to conduct heat rapidly away from the resistor-heater element 38 when the current to the individual lead 36 is shut off, a heat sink 44 is plated on to the common lead 34 on the backside 28 of the pixel. It is made of a good conductive material, as for example, gold, aluminum or indium. It leads directly to the main heat sink H. As will be seen in FIG. 4, the heat sink 44 extends between each adjacent pixel P in conductive contact with the common leads 34. Thus, each heater element 38 is separated from the adjacent element 38 by an air gap.

It is contemplated that an array or matrix of 262,144 pixels, comprising 512 rows of pixels, each row containing 512 pixels, will be assembled as seen in FIG. 1.

Figure 5:
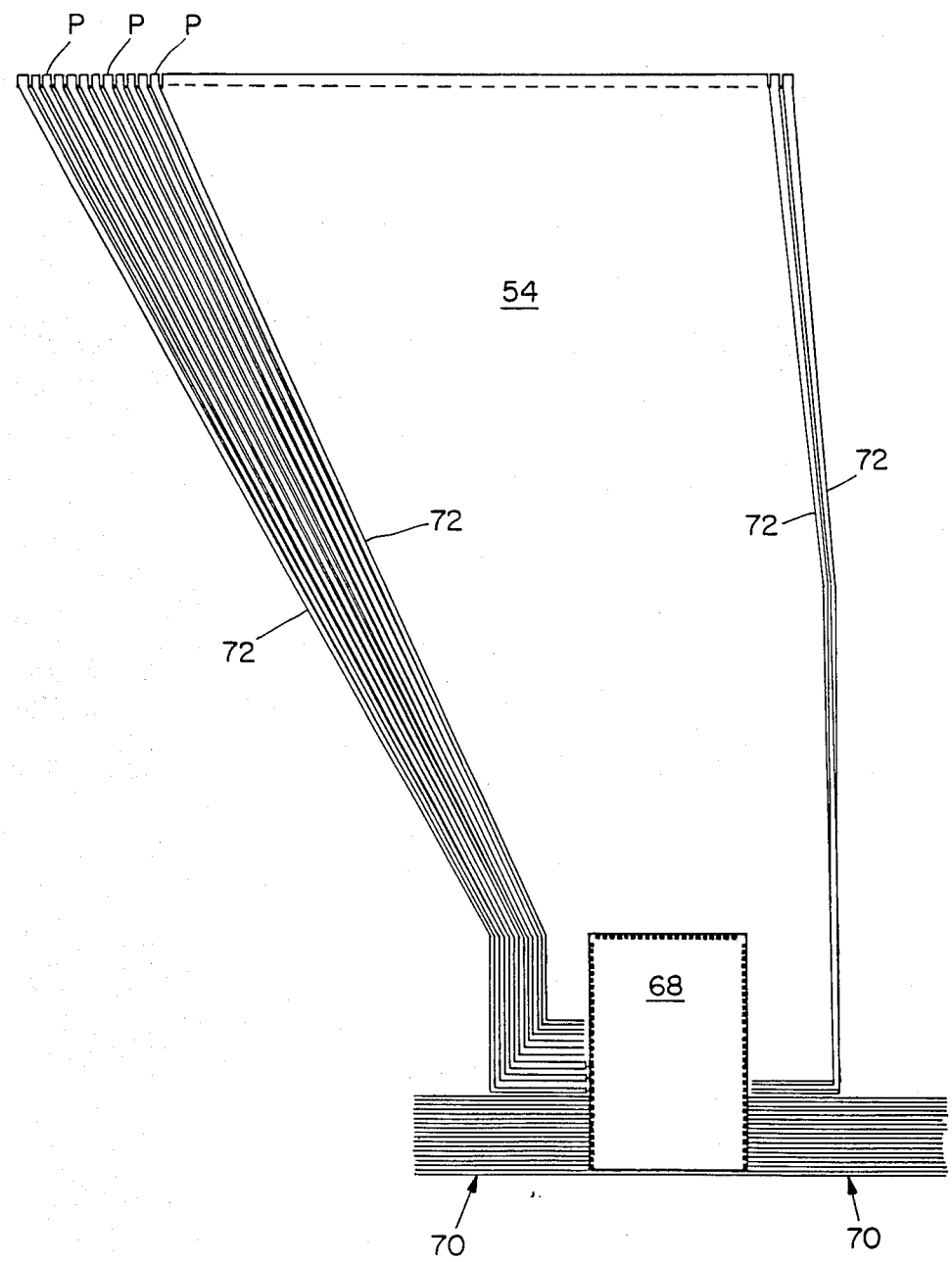
FIG. 5 is a detail view of one segment of a board of pixels showing a portion of the dedicated control leads.
Figure 6:
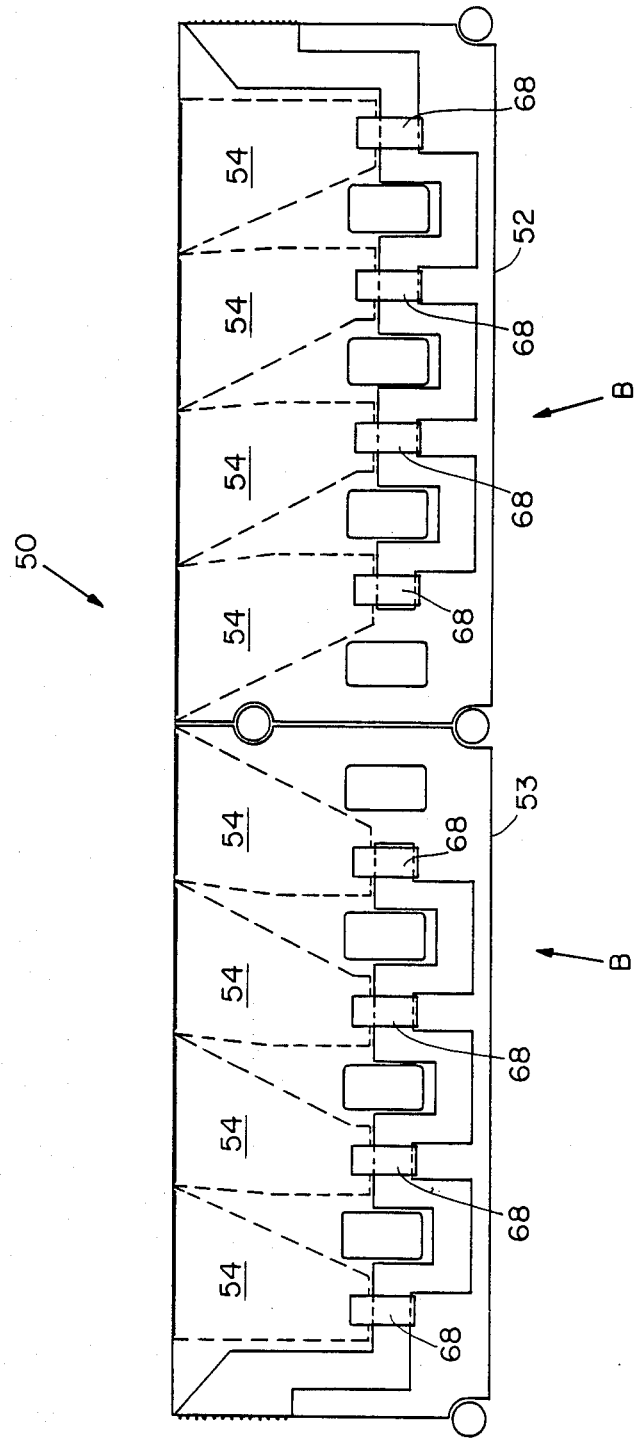
FIG. 6 is a side elevation of one row of pixels comprising two boards assembled end to end.

Each row 50 of pixels comprises two boards B designated 52 and 53 assembled end to end as seen in FIG. 6. Each board B has four groups 54 of sixty-four pixels each arranged in a row. Each group 54, comprising sixty-four pixels, is controlled by a single integrated circuit chip 68 (See FIG. 5.) Parallel address control lines 70 are connected to appropriate leads on the chip 68 and continue on to subsequent chips. Sixty-four individual power leads each designated 72 (which in FIGS. 2 to 4 are indicated as the dedicated leads 36) extend from the chip 68 upwardly on the surface of the board B to the pixels P formed at the top edge of the board. The power leads 72 (or dedicated leads 36) are formed by etching the conductive material 36 plated onto the front surface 26 of the pixel P and hence of the board. The leads 72 being, in fact, made of the conductive material 36 referred to previously.

Referring next to FIGS. 5 and 7, the parallel address and control lines 70, are photolithographically formed of the conductive material 36 of the boards B and follow a pattern across the board in a series of substantially U-shaped configurations 74 and then upwardly of the board as at 76, around the edge, and subsequentially connected in parallel with leads to other boards B.

Spaced longitudinally across the board are a plurality of openings 80 and between each opening is located the integrated circuit control chips 68. These control chips are connected by the etched leads 72 to the pixels formed on the board to which the chips are attached. As seen in FIGS. 7A and 8A, the chips 68 project from the face of the board.

Figure 8:
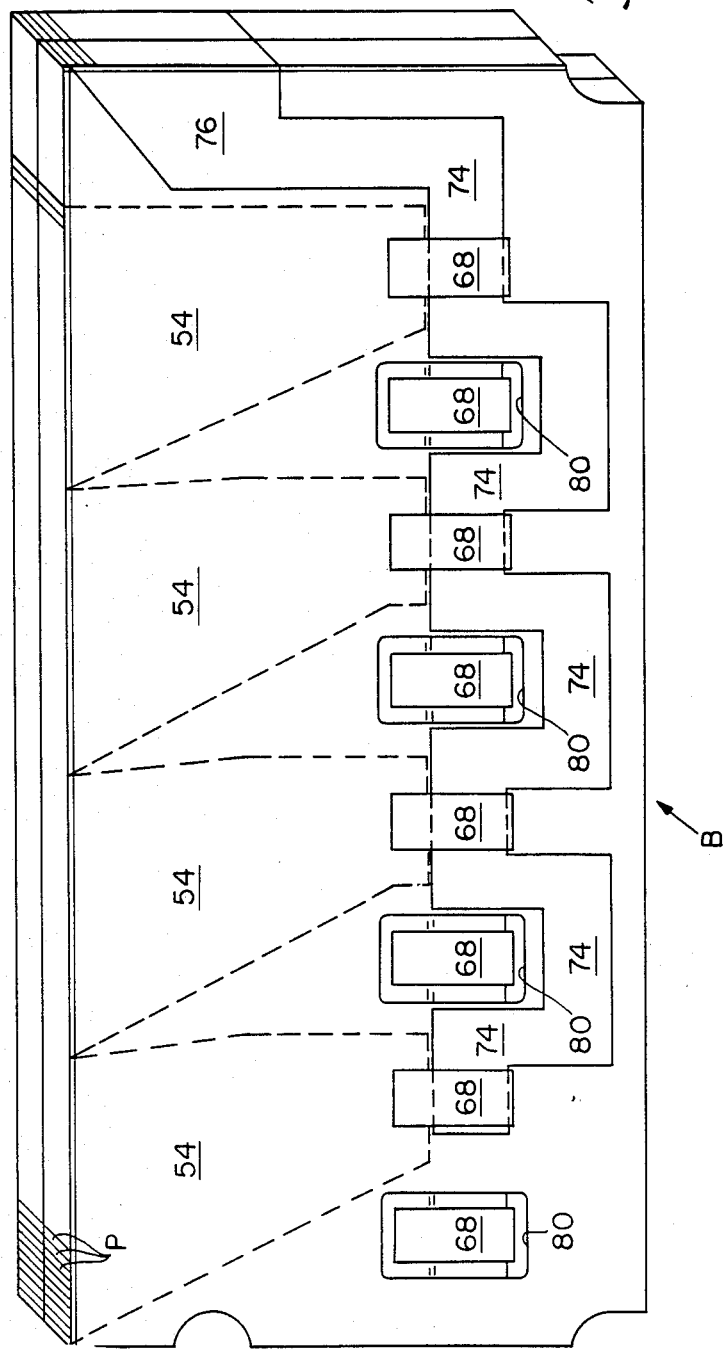
FIG. 8 is a perspective view of two boards assembled back to back.
Figure 8A:
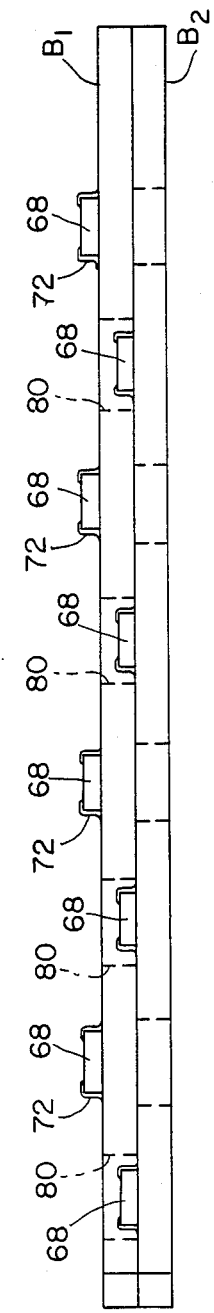
FIG. 8A is a bottom view of the boards shown in FIG. 8.

Referring next to FIGS. 8 and 8A, there will be seen two boards, $B_1$ and $B_2$, assembled together. The boards are substantially identical except that the chips on the board designated $B_2$ are aligned with the openings 80 on board $B_1$ and are accommodated therein in the assembled matrix. Conversely, the chips 68 on board $B_1$ would be accommodated in openings in the next adjacent board (not shown).

We claim:

1. A dynamic thermal display simulator for testing thermal sensors comprising:
   a matrix of individually programmable resistive elements,
   a plurality of elements being arranged in a linear array on one exposed edge of a narrow board comprising a low thermal conductive, electrically insulating substrate,
   a plurality of narrow boards being arranged side-by-side in rows to create the matrix, and a plurality of integrated circuit chips secured to each narrow board.

2. A display simulator according to claim 1 wherein each resistive element in the linear array is separated from the adjacent element.

3. A display simulator according to claim 1 wherein each board in the matrix is separated from the adjacent board by an insulating film.

4. A display simulator according to claim 1 wherein each resistive element is connected to a heat sink.

5. A display simulator according to claim 1 wherein each resistive element is connected to at least one conductor lead.

6. A display simulator according to claim 1 wherein there are a plurality of integrated circuit chips secured to each board and each board includes an aperture for accommodating the chips on an adjacent board thereby to permit the boards to be assembled in close proximity.

7. A display simulator according to claim 1 wherein there are a plurality of integrated circuit chips secured to each board, each chip being in communication with a plurality of leads, each lead being dedicated to one resistive element.

8. A heater element for a thermal display simulator comprising one of a plurality of pixels which are arranged in a predetermined matrix,
   each pixel comprising one of a plurality of members projecting from a common substrate of insulating material in the form of a narrow board,
   a plurality of integrated circuit chips secured to each narrow board,
   resistive material deposited on one exposed end surface of the substrate material forming the pixel,
   a common lead on the substrate material connected to one portion of the resistive material, as well as, to the resistive material of other pixels,
   a dedicated lead on the substrate material connected to a different portion of the resistive material,
   an insulating material deposited on one of said leads on the substrate,
   and a heat sink connected to the other of said leads on the substrate.

9. A heater element according to claim 8 wherein the substrate portion of the pixel is a substantially rectangular solid projecting from the narrow board of insulating material which substrate material forms a plurality of other projecting pixels.

10. A heater element according to claim 8 wherein the resistive material is deposited as a film on the one exposed end surface of the substrate.

11. A heater element according to claim 8 wherein the leads are deposited as films on substantially parallel surfaces of the substrate which are substantially normal to the exposed end surface.

12. A heater element according to claim 8 wherein the leads are in contact with the resistive material along chamfered edges of the substrate contiguous with the exposed end surface.

13. A heater element according to claim 8 wherein the insulating material which is superposed on the lead terminates at a point spaced from the resistive material.

14. A heater element according to claim 8 wherein the heat sink of one pixel is in engagement with the insulating material of an adjacent pixel.

15. A heater element according to claim 8 wherein each pixel is separated from the adjacent pixel.

16. A dynamic thermal display simulator for testing thermal sensors comprising:
    a matrix of individually programmable resistive elements electrically insulated from each other and arranged on a plurality of narrow boards and lying substantially in a plane,
    means for conducting energy to each resistive element including a plurality of integrated circuit chips secure to each narrow board to heat said resistive element and produce infrared radiation,
    means to conduct heat away from each element to reduce the infrared radiation, and
    control means responsive to predetermined programming to control the conduction of energy to and from the resistive elements to produce a discernible pattern on the plane.

17. A display simulator according to claim 16 wherein each resistive element is separated from the adjacent resistive element by an air space.

18. A display simulator according to claim 16 wherein each resistive element is connected to a heat sink.

19. A display simulator according to claim 16 wherein each resistive element is connected to conductor leads.

* * * * *